Nov. 15, 1955  O. GARAPOLO  2,723,645
APPARATUS TO PROVIDE MEAT WITH A SURFACE GLAZE OF ICE
Filed Oct. 24, 1951  4 Sheets-Sheet 1
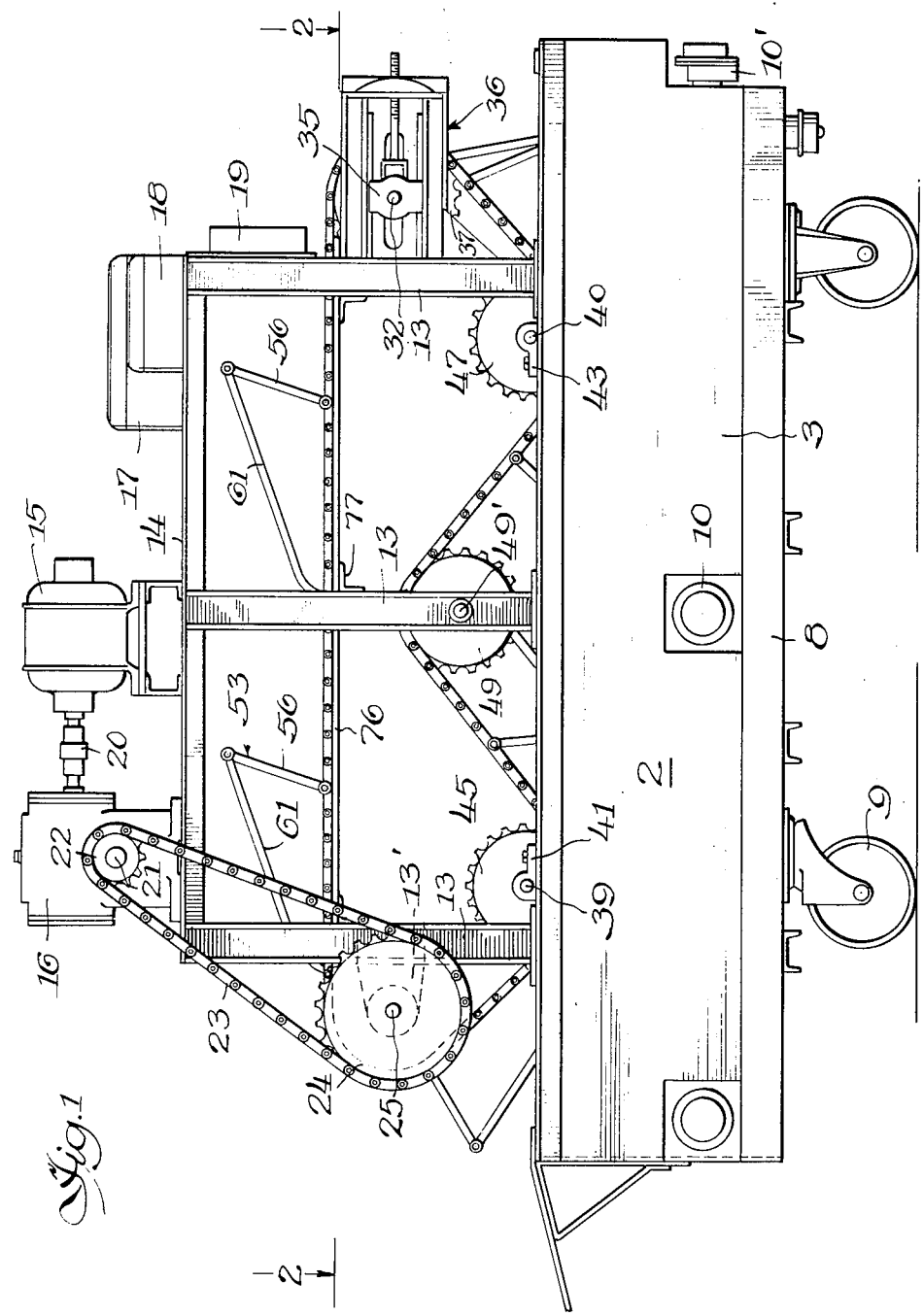
Inventor:
Orlando Garapolo,
By: Schneider & Dressler, Attys.

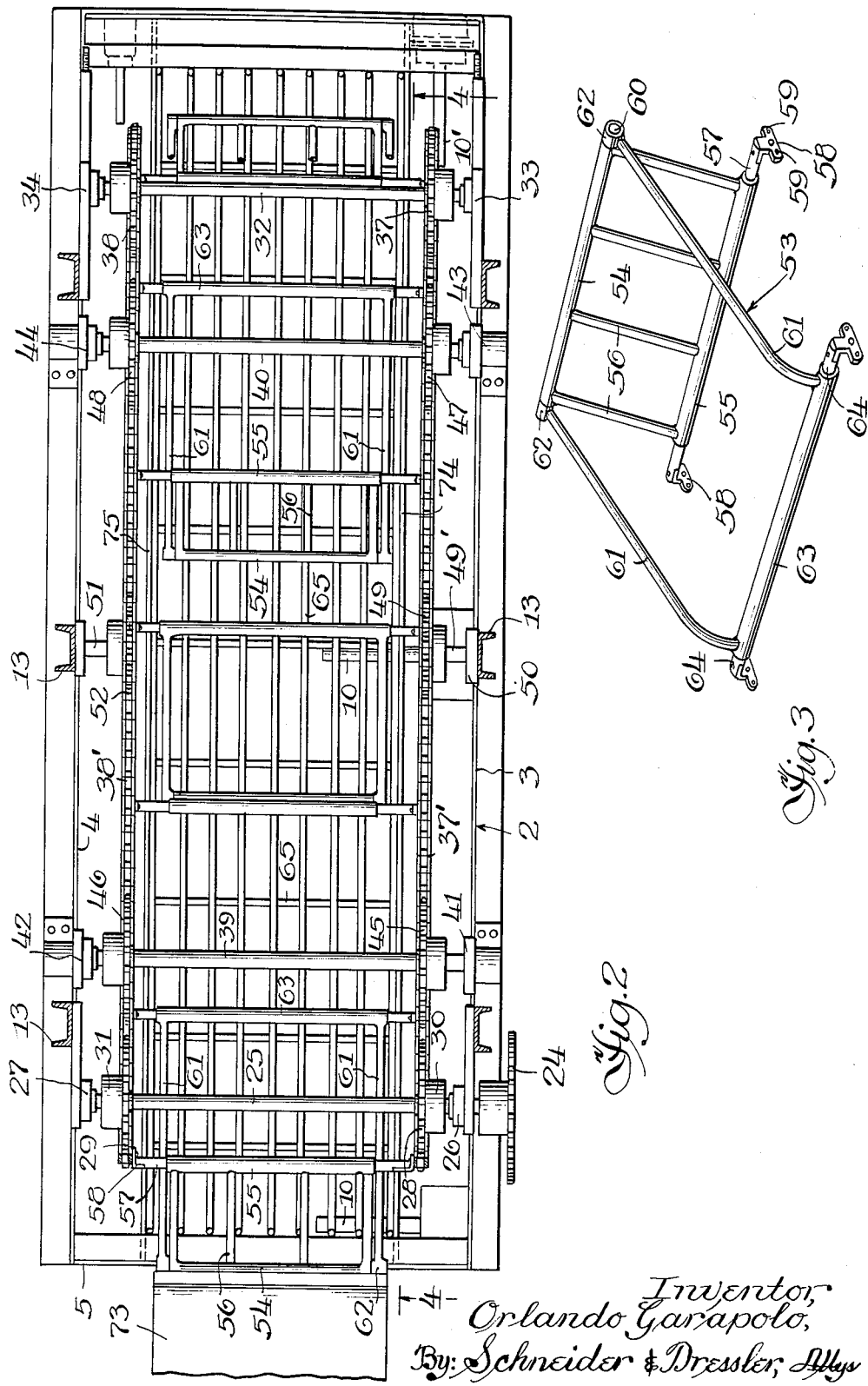

Nov. 15, 1955 O. GARAPOLO 2,723,645
APPARATUS TO PROVIDE MEAT WITH A SURFACE GLAZE OF ICE
Filed Oct. 24, 1951 4 Sheets-Sheet 3
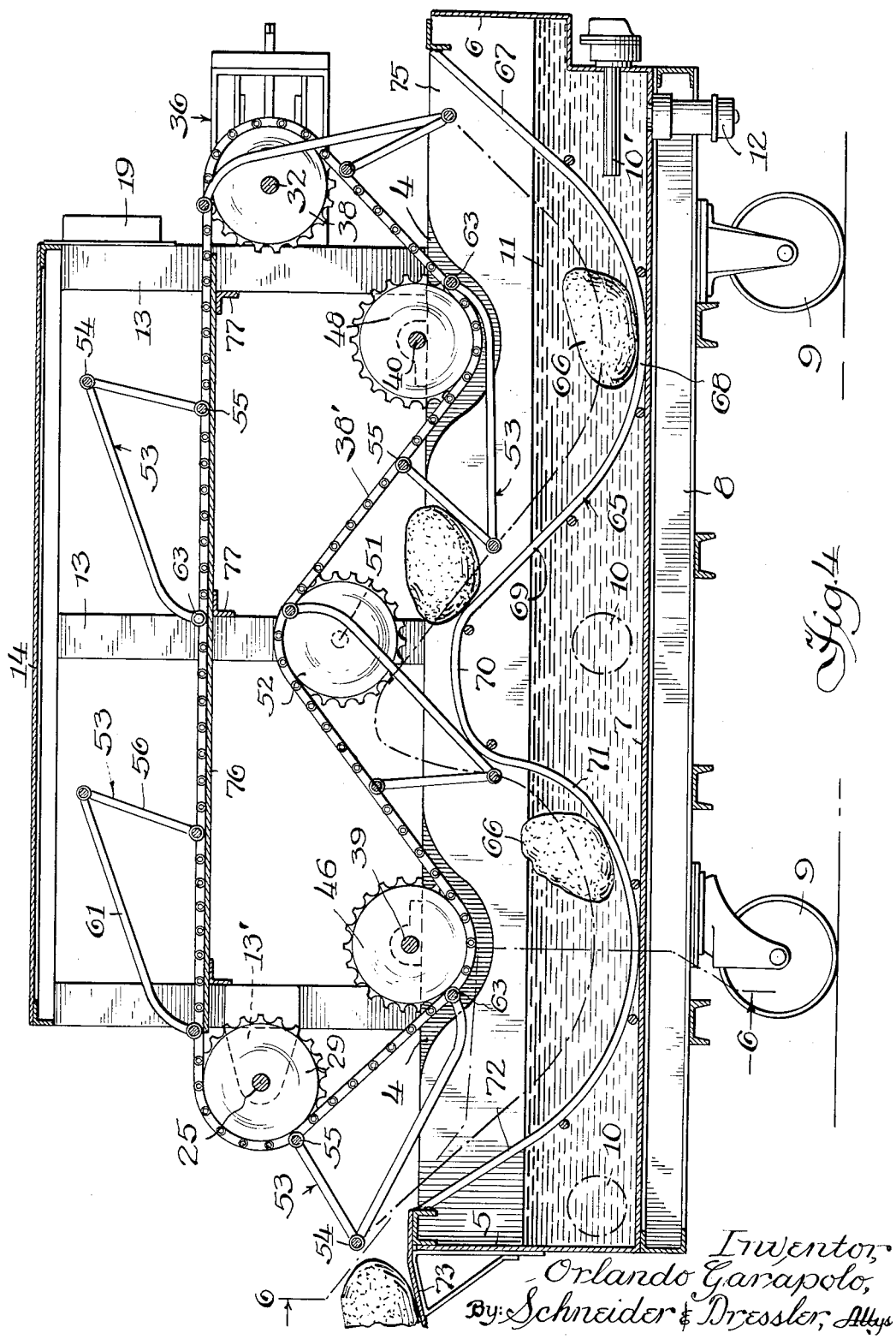

Nov. 15, 1955   O. GARAPOLO   2,723,645
APPARATUS TO PROVIDE MEAT WITH A SURFACE GLAZE OF ICE
Filed Oct. 24, 1951   4 Sheets-Sheet 4

Inventor,
Orlando Garapolo,
By: Schneider & Dressler, Attys

United States Patent Office 2,723,645
Patented Nov. 15, 1955

2,723,645

APPARATUS TO PROVIDE MEAT WITH A SURFACE GLAZE OF ICE

Orlando Garapolo, Chicago, Ill., assignor to Wilson & Co., Inc., a corporation of Delaware Application October 24, 1951, Serial No. 252,927

10 Claims. (Cl. 118—30)

This invention relates to a ham glazing apparatus and has particular reference to a machine capable of operating continuously, for dipping hams or pork bellies into water and removing them into a freezing atmosphere to provide a surface glaze of ice about the hams or pork bellies to protect them against freezer burns during storage, and dehydration.

Hams and pork bellies are frequently held in storage at temperatures ranging from 0° to 5° F. before they are processed for human consumption. When taken from storage and permitted to thaw to room temperature, such hams and pork bellies frequently show freezer burns. These freezer burns show as discolored areas which must be cut away before the meat can be sold. This, obviously, is wasteful of the material, time consuming and costly. In order to prevent the formation of freezer burns and the objectionable costs incident thereto, meats, such as hams and pork bellies, have been surface-glazed with a coating of ice before being placed in storage.

The surface glaze has been successful as a preventative for freezer burns, but the methods of forming the surface glaze were not satisfactory for various reasons. For example, if the water was sprayed on the meat, portions of the meat in contact with the structure on which the meat was supported were not coated.

The apparatus embodying the present invention permits hams and pork bellies to be inserted continuously at one end of a dipping tank and removed at the opposite end. Each ham or pork belly is engaged by a paddle which pushes it through one dipping operation and into the freezing atmosphere to give it one coat of ice, and continues to push it through a second dipping operation to give a second coat. Although each ham or pork belly is pushed through two successive dipping operations by the same paddle which engages it at the start of the first operation, the hams and pork bellies are not in continuous contact with the paddle, and the coating of ice is continuous around the entire surface area of each ham and pork belly because no area of the meat is continuously insulated from the water and the cold air which cooperate to form the ice glaze.

The dipping tank is provided with immersion heaters to keep the water just above freezing. When the meats are pushed into the atmosphere after the first dipping operation an ice glaze is immediately formed because the temperature of the meat product and the temperature of the room in which the dipping tank is located is well below freezing. When the meat is pushed into the water for its second dipping operation, it does not stay in the water long enough to melt the first coating of ice, and a second coating of ice is formed over the first coat as soon as the meat is again pushed out of the dipping tank into the atmosphere. The dipping operation is continuous, and no time need be lost to load or to unload the apparatus.

Other advantages of applicant's apparatus will be apparent from a reading of the following description, taken in conjunction with the accompanying drawings showing a preferred illustrative embodiment of the invention, in which:

Figure 1 is a side elevation of the apparatus comprising a preferred embodiment of the invention;

Fig. 2 is a cross sectional view, taken along the line 2—2 of Fig. 1;

Fig. 3 is a detail perspective view of one of the paddles for pushing the hams through the dipping tank;

Fig. 4 is a longitudinal sectional view, taken along the line 4—4 of Fig. 2;

Figure 6:
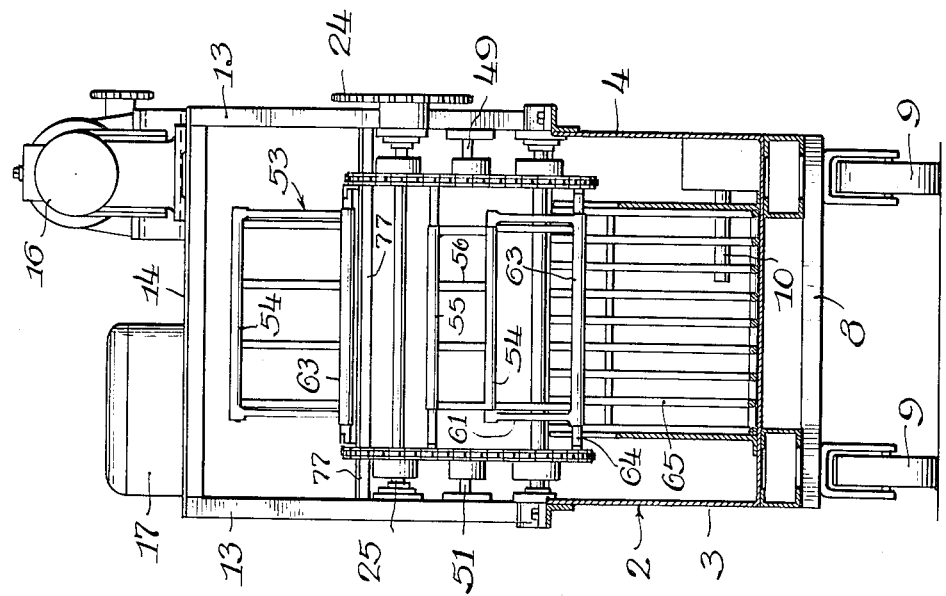
Fig. 6 is a cross sectional view, taken along the line 6—6 of Fig. 4.
Figure 5:
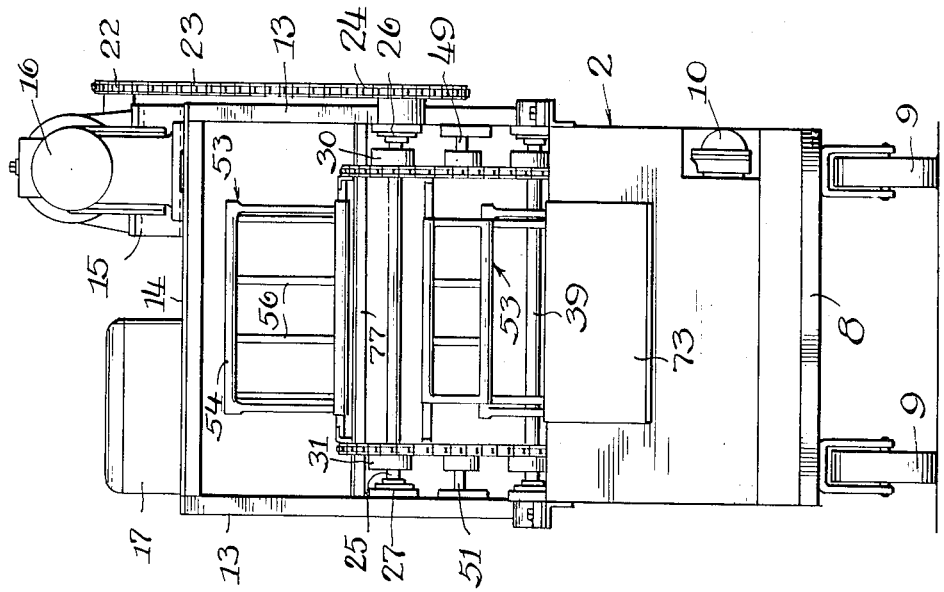
Fig. 5 is an end elevation of the apparatus.

Referring to the drawings, the reference numeral 2 indicates a dipping tank comprising side walls 3 and 4, end walls 5 and 6, and a bottom 7, suitably supported on a frame 8. A plurality of casters 9 is mounted on the frame to permit the apparatus to be moved so that it may always be convenient to the supply of meats which are to be glazed. The tank is provided with a plurality of immersion heaters 10 to warm the water 11 in the tank and a thermostat 10' to maintain the temperature of the water just above freezing. A nipple 12 is secured to the bottom of the tank to facilitate emptying the tank of water whenever required.

A plurality of upright standards 13 mounted on the walls of the tank support a platform 14 above the tank a distance sufficient so that it does not interfere with the return movement of the paddles hereinafter described. Platform 14 supports a motor 15, a speed reducer 16, and various conventional electrical equipment, enclosed in housings 17, 18 and 19, for controlling the operation of the motor. A coupling 20 connects the speed reducer to the motor. The electrical wiring and equipment are conventional and will not be described in detail. Motor 15 rotates a shaft 21 to which a sprocket 22 is keyed. A chain 23 mounted on sprocket 22 extends around another sprocket 24 to rotate it.

The sprocket 24 is keyed to a shaft 25 journalled in bearings 26 and 27 mounted on brackets 13' secured to uprights 13. Sprockets 28 and 29 are keyed to shaft 25 adjacent opposite side walls of the tank. Collars 30 and 31 are mounted on shaft 25 to maintain the proper axial spacing of sprockets 28 and 29. A shaft 32 is mounted adjacent the opposite end of tank 2 in bearings 33 and 34. Bearings 33 and 34 are slidably mounted in brackets extending from the adjacent uprights 13 and shaft 32 extends through a plate 35 slidably mounted on a conventional take-up mechanism 36 by means of which the distance between shafts 25 and 32 may be adjusted to regulate the tautness of the sprocket chains hereinafter described. Sprockets 37 and 38, similar to sprockets 28 and 29, are mounted on shaft 32.

Shafts 39 and 40, each similar to shaft 25, are journalled in bearings 41, 42, and 43, 44, respectively. These bearings are mounted on the top of side walls 3 and 4, as indicated in Fig. 1. Sprockets 45 and 46 are mounted on shaft 39, and sprockets 47 and 48 are mounted on shaft 40. Sprockets 28, 37, 45 and 47 are all aligned in the same vertical plane, and sprockets 29, 38, 46 and 48 are all aligned in a vertical plane parallel thereto. Shafts 25 and 32 are in the same horizontal plane, and shafts 39 and 40 which are equally spaced inwardly of shafts 25 and 32 respectively, are in a horizontal plane spaced below the horizontal plane of shafts 25 and 32. A sprocket 49, similar to sprocket 28, is mounted on a stub shaft 49', journalled in a bearing 50 mounted on the center upright standard 13. The horizontal plane in which stub shaft 49' lies is approximately halfway between the horizontal plane of shafts 25, 32 and the horizontal plane of shafts 39 and 40. A stub shaft 51 is similarly mounted on standard 13 adjacent the opposite side wall of tank 2 in axial alignment with shaft 49'. A sprocket 52, similar to sprocket 49, is mounted on stub shaft 51.

Sprocket chain 37' extends around sprockets 28 and 37, under sprockets 45 and 47, and over sprocket 49. Sprocket chain 38' extends around sprocket 29 and 38, under sprockets 46 and 48, and over sprocket 52. Each sprocket chain is in mesh with the teeth of all the sprockets in its path of travel. The sprocket chains comprise an endless conveyor for a plurality of paddles 53 which extend transversely between the sprocket chains and are secured thereto at equally spaced intervals. The paddles are duplicates and therefore only one will be described.

Each paddle 53 comprises a pair of tubular frame members 54 and 55 rigidly joined to a plurality of cross bars 56. The cross bars are sufficiently close to each other to prevent a ham or pork belly from slipping between adjacent bars. Rod 57 passes through frame member 55 and is rotatable relative thereto. The free ends of rod 57 project from frame member 55 and a bracket 58 is rigidly secured to each projecting end. Each bracket is provided with a pair of apertures 59 spaced apart a distance equal to the link spacing of sprocket chains 37 and 38, so that they may be readily secured to the chains. Frame member 54 has a rod 60 projecting from each end, and a curved arm 61 is pivotally secured adjacent each end of frame member 54 by a ring section 62 mounted on rod 60 and rigidly secured to the end of arm 61. Ring 62 may be integral with arm 61. The other end of each arm 61 is rigidly secured to a tubular member 63. A rod 64, similar to rod 57, is provided through tube 63 so that it may be secured to sprocket chains 37' and 38' in the same manner as frame member 55. It is obvious that member 63 may be solid, and have the rods 64 pivotally secured thereto in any suitable manner. Frame member 55 is pivoted relative to rod 57, and member 63 is pivoted relative to rod 64 so that the angular relationship between cross bars 56 and the sprocket chains may change as required during the movement of paddles 53 and the chains around the various curves in the path of travel of sprocket chains 37' and 38' throughout the length of the dipping tank.

Referring to Fig. 4, the dipping tank is provided with a meat supporting screen 65 or other similar supporting surface extending longitudinally thereof with its opposite ends secured adjacent the top of end walls 5 and 6 of the tank. Screen 65 is made of heavy wire to give it substantial strength. The wires are spaced relatively far apart to support the hams with a minimum of contact. The screen follows roughly the shape of the path taken by the lower extremities of the paddles 53 as they pass through tank 2. The midsection of screen 65 is positioned above the normal water level of the tank and sections on both sides of the middle curve downwardly to the tank bottom.

The operation of the apparatus is very simple. At end 6 of the tank individual hams or pork bellies 66 are dropped on screen 65 and slide down incline 67 to the section 68 of the screen resting on bottom 7 of the tank. The sprocket chains are rotated continuously and cause the paddle 53 to engage the ham and push it up the incline 69 and out of the water on to the high midsection 70 of the screen. The shape of midsection 70 of the screen causes the ham to stay in the freezing atmosphere long enough to freeze the water adhering to the ham into a thin coating of ice. The paddle 53 then pushes the ice glazed ham down the incline 71 which is sharp enough to cause the ham to roll forwardly of the paddle, so that as it falls into the water for its second dip, it is wetted around its entire surface. The same paddle 53 again engages the ham and pushes it up incline 72 and onto an apron 73 secured to the top of end wall 5 of the tank. The length of time of the second dip is not sufficient to melt the first coating of ice, and as the ham is pushed out of the tank the water adhering thereto is frozen to form a second coating of ice. The process is continuous, and since the hams are removed from the dipping tank at the end opposite the end at which they are inserted, they may be fed into the tank as rapidly as the paddles can push them out of the way. It is never necessary to wait to unload the apparatus before inserting additional hams.

It should be noted that the pivotal connection between frame member 54 and arms 61 of the paddle enable the arms to furnish support for the cross bars 56 which actually push the ham through the tank, regardless of the various angles assumed by the sections of the paddle as the sprocket chains pass around the sprockets which govern the path of travel of the lower extremity of the paddle. The sprocket chains must pass over the top of sprockets 49 and 52 for the paddles to push the hams past the raised midsection 70 of the screen. Accordingly the paddles must pass between sprockets 49 and 52 and this makes it impossible to mount these sprockets on a common shaft in the same manner as the other sprockets are mounted. The stub shafts 49' and 51 terminate adjacent sprockets 49 and 52, respectively, and therefore do not prevent the passage of paddles 53 therebetween. As shown in Fig. 2, deflector plates 74 and 75 extending parallel to side walls 3 and 4 are secured to the tank just outside the outer edges of the paddles so that the hams cannot roll transversely out of the path of the paddles. The sprocket chains are close enough to the screen throughout their lower reach to make it impossible for a paddle to pass over a ham anywhere on the screen. The upper reach of the sprocket chains may be supported by rods 76 mounted on brackets 77 secured to upright standards 13.

Although I have described a preferred embodiment of the invention in considerable detail with particular reference to its use in encasing meats with a two-coat glaze of ice, it will be understood that the apparatus is not limited to such use. The description is intended to be illustrative, rather than restrictive, as many details may be modified or changed without departing from the spirit or scope of the invention. Accordingly, I do not desire to be restricted to the exact structure disclosed.

I claim:

1. An apparatus for use in a freezing atmosphere for glazing meats with a double coating of thin ice which comprises a dipping tank adapted to hold a body of water of sufficient depth to totally immerse a piece of meat to be glazed, a meat supporting screen extending longitudinally of said tank, said screen having its midsection above the normal water level of said tank and sections on each side of said midsection substantially below said normal water level, a series of sprockets positioned above said tank in a vertical plane adjacent the vertical plane of each side wall thereof, a sprocket chain extending around each of said series of sprockets, opposite sprockets of each series being positioned at such heights as to cause the lower reach of said chains to follow approximately the contour of said screen, a plurality of paddles secured at opposite edges to said sprocket chains, each of said paddles having a maximum height slightly less than the vertical distance between the lower reach of said chains and said screen, each of said paddles being engageable with a piece of meat placed in front of it to move it longitudinally along the screen from one end of the tank to the other, and means for moving said paddles at a speed to enable the meat pushed thereby to remain on the said midsection of said meat supporting screen for a time sufficient to form a coating of ice thereon and to be immersed in said body of water after having a first coating of ice formed thereon for a time insufficient to appreciably melt the first coating of ice formed thereon.

2. An apparatus for glazing meats with a double coating of thin ice which comprises a dipping tank adapted to hold a body of water of sufficient depth to immerse a piece of meat to be glazed, a meat supporting screen extending longitudinally of said tank, said screen having its midsection above the normal water level of said tank and sections on each side of said midsection substantially below said normal water level, a series of sprockets positioned above said tank in a vertical plane adjacent the vertical plane of each side wall thereof, a sprocket chain extending around each of said series of sprockets, opposite sprockets of each series being positioned at such heights as to cause the lower reach of said chains to follow approximately the contour of said screen, and a plurality of paddles each comprising a frame member secured at its opposite ends to said sprocket chains, a second frame member, a plurality of cross bars rigidly secured to said frame members, a tubular member secured at its opposite ends to said sprocket chains, and a pair of arms each rigidly secured at one end to said tubular member and pivotally secured at its other end to said second frame member, the distance between said first and second frame members being slightly less than the vertical distance between the lower reach of said sprocket chains and said screen, whereby said paddles are engageable with meats placed on said screen adjacent one end of said tank to push them along said screen to the opposite end of said tank.

3. In an apparatus for use in a freezing atmosphere for glazing meats with a double coating of thin ice, a dipping tank adapted to hold a body of water of sufficient depth to totally immerse a piece of meat to be glazed, a meat supporting screen having two portions positioned below the normal water level of the tank and an intermediate portion positioned above said normal water level, a conveyor mounted above said screen, a plurality of paddles secured to said conveyor and carried thereby along a path of travel of approximately the same contour as said screen but positioned slightly above the screen, said paddles being engageable with meats placed on said screen adjacent one end of said tank to push them along said screen to the opposite end of said tank, means in said tank for maintaining the temperature of the water to be contained therein at a temperature above freezing and means for moving said conveyor at a speed such that the meat pushed by said paddles onto said intermediate portion of said meat supporting screen will remain thereon for a time sufficient to form a coating of ice thereon and then be immersed for a second dipping operation for a time insufficient to appreciably melt the coating of ice previously formed thereon.

4. In an apparatus for glazing meats with a double coating of thin ice, a dipping tank adapted to hold a body of water of sufficient depth to immerse a piece of meat to be glazed, a meat supporting screen having two portions positioned below the normal water level of the tank and an intermediate portion positioned above said normal water level, a conveyor mounted above said screen, and a plurality of paddles each comprising a pair of parallel frame members, a plurality of cross bars rigidly secured to said frame members, one of said frame members being pivotally secured to said conveyor, a cross member secured to said conveyor and an arm rigidly secured at one end to said cross member and pivotally secured at its other end to said other frame member, the distance between said frame members being slightly less than the vertical distance between said conveyor and said screen, said conveyor having a path of travel approximating the contour of said screen, whereby said paddles are engageable with meats placed on said screen to move them along said screen.

5. In an apparatus for use in a freezing atmosphere for glazing meats, a tank adapted to hold a body of water of sufficient depth to totally immerse a piece of meat to be glazed, a meat supporting surface within said tank having portions adjacent the tank bottom and an intermediate portion adjacent the upper edge of the tank, a conveyor having a plurality of paddles secured thereto, said conveyor being adapted to carry said paddles along a line approximately parallel to the meat supporting surface, said paddles each being of a height slightly less than the vertical distance between said conveyor and said meat supporting surface, means in said tank for maintaining the temperature of the water to be contained therein at a temperature above freezing and means for moving said conveyor at a speed such that the meat pushed by said paddles onto said intermediate portion of said meat supporting surface will remain thereon for a time sufficient to form a coating of ice thereon and then be immersed for a second dipping operation for a time insufficient to appreciably melt the coating of ice previously formed thereon.

6. In an apparatus for use in a freezing atmosphere for glazing meats, a dipping tank adapted to hold a body of water of sufficient depth to totally immerse a piece of meat to be glazed, a meat supporting surface within said tank having two portions positioned below the normal water level of the tank and an intermediate portion positioned above said normal water level, a plurality of longitudinally spaced pairs of sprockets suitably mounted above said tank with the opposite sprockets of each pair each positioned in common vertical planes adjacent the opposite side walls of the tank, the axis of each of said pairs of sprockets being spaced at approximately the same distance from the closest adjacent point of said meat supporting surface, a pair of sprocket chains each extending around all of the sprockets in one of said common vertical planes, means to rotate said chains simultaneously in the same direction, and a plurality of paddles secured to said sprocket chains so as to be positioned between said chains and said meat supporting surface during the travel of said chains along their lower reach, each paddle being engageable with meats positioned on said screen and means in said tank for maintaining the temperature of the water to be contained therein at a temperature above freezing, said chain rotating means being adapted to move said paddles at a speed such that the meat pushed by said paddles onto said intermediate portion of said meat supporting surface will remain thereon for a time sufficient to form a coating of ice thereon and then be immersed for a second dipping operation for a time insufficient to appreciably melt the coating of ice previously formed thereon.

7. In an apparatus for glazing meats, a dipping tank having side walls, end walls and a bottom wall, said tank being adapted to contain water of a sufficient depth to completely immerse a piece of meat to be glazed, a screen within said tank having its opposite ends secured adjacent the upper edge of opposite end walls of the tank, said screen having a downwardly inclined surface adjacent each end leading to a low point adjacent the bottom of the tank and upwardly inclined surfaces leading to an intermediate high point above the normal water level of the tank and means in said tank for maintaining the temperature of the water to be received thereby at a temperature above freezing.

8. In an apparatus for glazing meats, a dipping tank having side walls, end walls and a bottom wall, said tank being adapted to contain a sufficient quantity of water to completely immerse the meat to be glazed, a screen within said tank having its opposite ends secured adjacent the upper edge of opposite end walls of the tank, said screen having a downwardly inclined surface adjacent each end leading to a low point adjacent the bottom of the tank and upwardly inclined surfaces leading to an intermediate high point above the normal water level of the tank, supporting framework projecting above the side walls of said tank, a plurality of sprockets supported at various heights in longitudinally spaced relationship by said framework along opposite sides of said tank, a sprocket chain extending around the sprockets at each side of the tank, means to drive each of said chains, a plurality of paddles secured to said chains, said paddles being carried above the surface of said screen at a uniformly spaced distance therefrom along its entire length, whereby meats placed on said screen are moved longitudinally thereof from one end of said tank to the other and means in said tank for maintaining the temperature of the water to be contained therein at a temperature above freezing, said chain driving means being adapted to move said paddle at a speed such that the meat pushed by said paddles onto said intermediate portion of said meat supporting screen will remain above the normal water level for a time sufficient to form a coating of ice thereon and then be immersed for a second dipping operation for a time insufficient to appreciably melt the coating of ice previously formed thereon.

9. An apparatus for glazing meats with a double coating of thin ice, a dipping tank adapted to contain a sufficient quantity of water to completely immerse a piece of meat to be glazed, said tank including a meat supporting surface having two portions below the normal water level of the tank and an intermediate portion positioned above said normal water level, a conveyor mounted above said tank, and a plurality of paddles each comprising a pair of joined parallel frame members, one of said frame members being pivotally secured to said conveyor, a cross member secured to said conveyor and an arm rigidly secured at one end to said cross member and pivotally secured at its other end to said other frame member, the distance between said frame members being slightly less than the vertical distance between said conveyor and said meat supporting surface, said conveyor having a path of travel approximating the contour of said meat supporting surface, whereby said paddles are engageable with meats placed on said screen to move them along said screen.

10. In an apparatus for use in a freezing atmosphere, a tank, means in said tank for maintaining the temperature of water therein slightly above freezing, a meat supporting surface extending longitudinally of said tank, said meat supporting surface comprising two end sections disposed adjacent the bottom of said tank, and an intermediate section above the water level to which said tank is filled, and a conveyor system mounted above said tank and having extensions which are movable by the conveyor system longitudinally of said tank, said extensions being adapted to engage meat to be glazed adjacent one end of said tank and to move it along the entire length of said meat supporting surface at a uniform rate of speed, said intermediate section, which is in said freezing atmosphere, being long enough to cause a first glaze coating to be formed on said meat during its movement from said first end section of said meat supporting surface to said second end section, and said second end section being short enough to prevent melting of said first glaze coating during movement of said meat through said second end section.

References Cited in the file of this patent

UNITED STATES PATENTS

| | | |
|---|---|---|
| 315,390 | Cusson | Apr. 7, 1885 |
| 567,144 | Ladd | Sept. 8, 1896 |
| 601,658 | Kaestner | Apr. 5, 1898 |
| 1,053,701 | Bond | Feb. 18, 1913 |
| 1,922,795 | DeRome | Aug. 15, 1933 |
| 2,093,069 | Bedford | Sept. 14, 1937 |
| 2,127,180 | Mandell | Aug. 16, 1938 |
| 2,380,968 | Kimmig et al. | Aug. 7, 1945 |
| 2,411,042 | King et al. | Nov. 12, 1946 |

OTHER REFERENCES

Refrigeration of Fish, by Harden F. Taylor—Dept. of Commerce (1927), Bureau of Fisheries Document No. 1016 (only pgs. 546–551 and 587–589 relied upon).